US008375285B2

(12) United States Patent
Grigsby et al.

(10) Patent No.: US 8,375,285 B2
(45) Date of Patent: Feb. 12, 2013

(54) ENABLING ACCESS TO DATA FILES UNSUPPORTED BY A COMPUTING DEVICE

(75) Inventors: Travis M. Grigsby, Austin, TX (US); Frank L. Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/638,043

(22) Filed: Dec. 15, 2009

(65) Prior Publication Data

US 2011/0145687 A1    Jun. 16, 2011

(51) Int. Cl.
*G06F 17/00* (2006.01)
(52) U.S. Cl. .......................... 715/206; 715/203; 715/741
(58) Field of Classification Search .................. 715/207, 715/208, 239, 203, 206, 741
See application file for complete search history.

(56) References Cited

U.S. PATENT DOCUMENTS

| | | | |
|---|---|---|---|
| 6,208,995 B1* | 3/2001 | Himmel et al. ........................ 1/1 |
| 7,299,240 B1 | 11/2007 | Crozier | |
| 7,317,907 B2 | 1/2008 | Linkert et al. | |
| 7,457,631 B2 | 11/2008 | Yach et al. | |
| 7,526,768 B2* | 4/2009 | Schleifer et al. .............. 719/310 |
| 7,899,917 B2* | 3/2011 | Chitre et al. .................. 709/228 |
| 8,005,843 B2* | 8/2011 | Sweet et al. .................. 707/741 |
| 2005/0076296 A1 | 4/2005 | Lee et al. | |
| 2005/0114431 A1 | 5/2005 | Singh et al. | |
| 2005/0124317 A1* | 6/2005 | Kaplan ......................... 455/411 |
| 2005/0176453 A1 | 8/2005 | Yach et al. | |
| 2006/0172724 A1 | 8/2006 | Linkert et al. | |
| 2006/0224640 A1 | 10/2006 | Yuan et al. | |
| 2007/0245223 A1 | 10/2007 | Siedzik et al. | |
| 2007/0255854 A1* | 11/2007 | Khosravy et al. ............. 709/248 |
| 2010/0057765 A1* | 3/2010 | Dispensa et al. ............. 707/102 |
| 2010/0242094 A1* | 9/2010 | Hussain et al. .................... 726/4 |
| 2010/0262657 A1* | 10/2010 | Little ............................. 709/204 |
| 2010/0325155 A1* | 12/2010 | Skinner et al. ................ 707/770 |

FOREIGN PATENT DOCUMENTS

WO    2007067123 A2    6/2007

OTHER PUBLICATIONS

"Coda File System", 1 page, retrieved Nov. 10, 2009 http://www.coda.cs.cmu.edu/trac/wiki/TracRss.

* cited by examiner

*Primary Examiner* — Stephen Hong
*Assistant Examiner* — Matthew Ludwig
(74) *Attorney, Agent, or Firm* — Yee & Associates, P.C.; Jeffrey S. LaBaw

(57) ABSTRACT

A computer implemented method, apparatus, and computer program product for managing access to data files. A first computer device sends a data file to a web server which hosts the data file. Responsive to sending the data file to the web server, the first computer device receives from the web server a web page link to the data file hosted at the web server. The first computer device creates, in a web browser application in the first computer device, a bookmark associated with the web page link. The first computer device then synchronizes the bookmarks in its web browser application with the bookmarks in the web browser application of a second computer device to allow a bookmark associated with the web page link to also be created in the web browser application of the second computer device.

20 Claims, 4 Drawing Sheets

ENABLING ACCESS TO DATA FILES UNSUPPORTED BY A COMPUTING DEVICE

BACKGROUND

1. Field

The illustrative embodiments relate generally to data processing systems and in particular to transferring data between data processing systems. Still more particularly, the illustrative embodiments relate to a computer implemented method, apparatus, and computer program code for allowing data files not transferrable to a computer device to be accessed by the computer device via a web server.

2. Description of the Related Art

A computer network is a group of computers that are connected to each other for the purpose of communication. Communications networks, including wide area networks ("WANs") and local area networks ("LANs") provide the ability for individual computers and users to share various resources on the network. One important form of resource sharing is the ability to transfer a data file from one computer or device onto a different computer or device. For example, a laptop or portable computer attached to the network could have the ability to move one or more files to a mobile phone or other device that is also connected to the network. On some devices, however, the data transfer and synchronization software may be limited in the types of data files that can be accepted or received by the devices. Thus, although a user may attempt to transfer a data file from one computer to another computer, the receiving device may not be able to accept the types of data files being transferred. Examples of devices often having format-specific data limitations include mobile and hand held devices, such as notebook computers, cell phones, and personal digital assistants (PDAs).

SUMMARY

According to one embodiment, a computer implemented method, apparatus, and computer program code are provided to allow data files not transferrable to a computer device to be accessed by the computer device via a web server. A first computer device sends a data file to a web server which hosts the data file. Responsive to sending the data file to the web server, the first computer device receives from the web server a web page link to the data file hosted at the web server. The first computer device creates, in a web browser application in the first computer device, a bookmark associated with the web page link to the data file hosted at the web server. The first computer device then synchronizes the bookmarks in its web browser application with the bookmarks in the web browser application of a second computer device to allow a bookmark associated with the web page link to the data file hosted at the web server to also be created in the web browser application of the second computer device.

DETAILED DESCRIPTION

Figure 1:
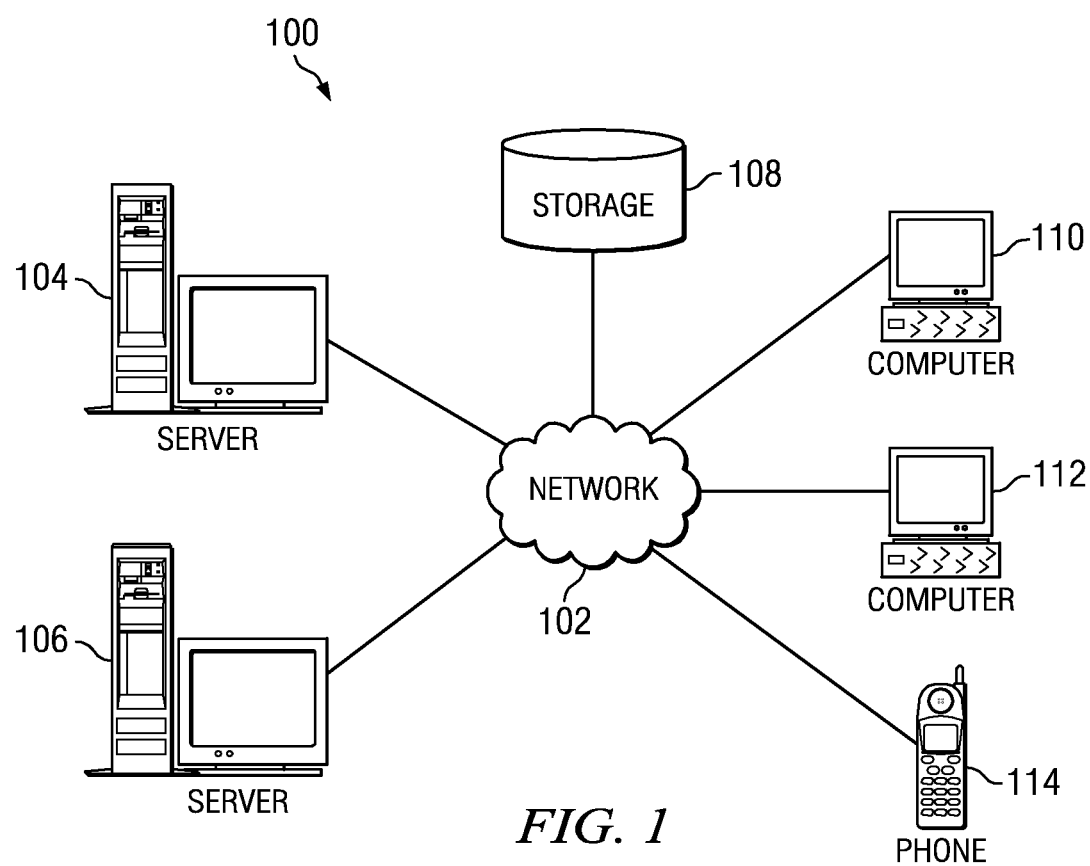
FIG. 1 depicts a pictorial representation of a network of data processing systems in which the illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the disclosure may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the aspects of the disclosure may be written in any combination of one or more programming languages, including an object oriented programming language such as Java, Smalltalk, C++, Voice eXtensible Markup Language (VXML) or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The aspects of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
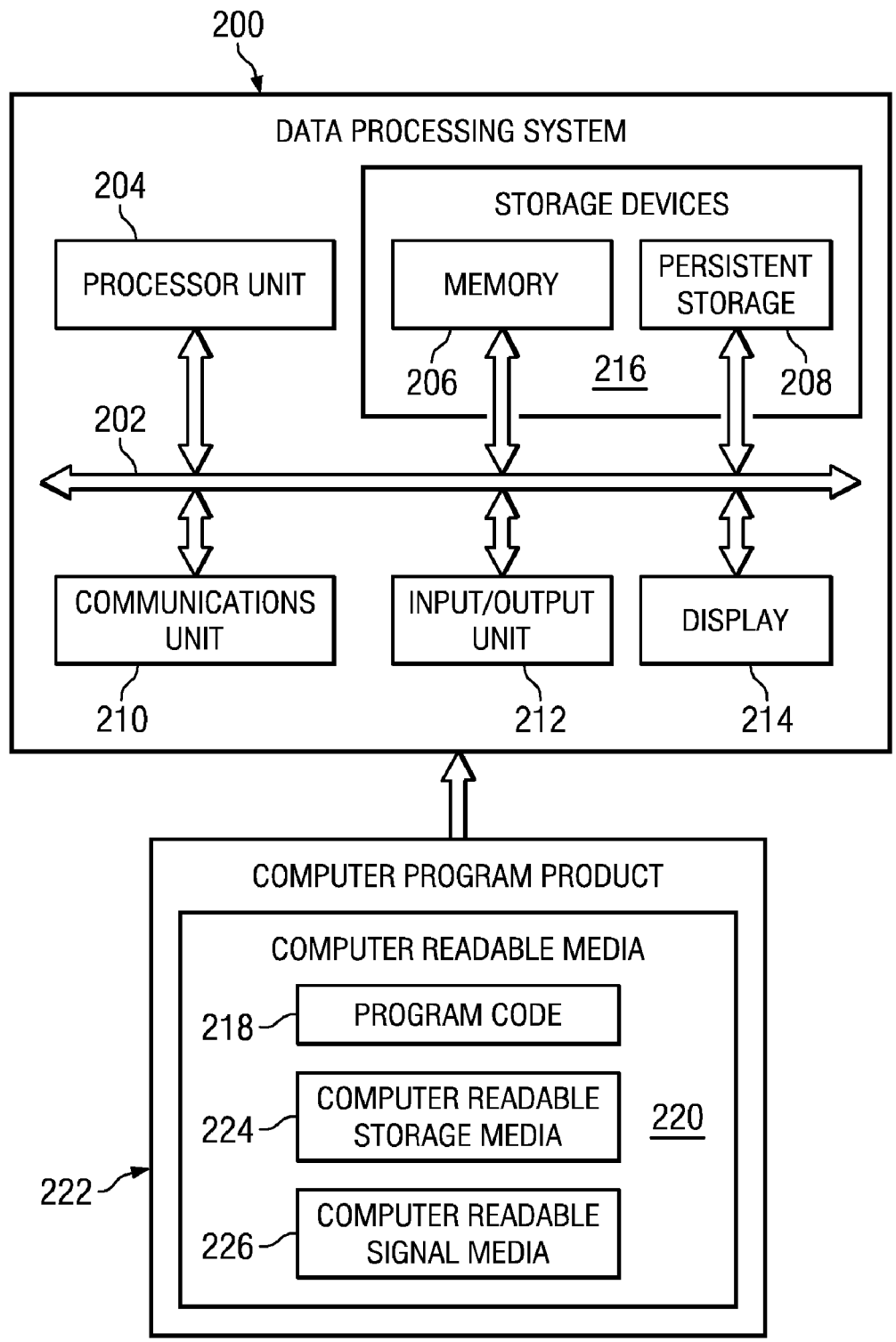
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, computers 110 and 112 and phone 114 connect to network 102. Computers 110 and 112 may be, for example, personal computers or network computers. Phone 114 may be, for example, any mobile phone or smart phone. In the depicted example, server 104 provides information, such as boot files, operating system images, and applications to computers 110 and 112 and phone 114. Computers 110 and 112 and phone 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to computer 110 over network 102 for use on computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or computer 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random-access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, some computer devices are not able to receive data files having formats that are unsupported by the computer devices. These devices often include mobile and hand held devices with limited software capabilities, such as cell phones and personal digital assistants (PDAs). The illustrative embodiments provide a solution to these software limitations by providing a computer implemented method, apparatus, and computer program code that enables a computer device that cannot receive a data file to still be able to access the content of the data file via a web server. A first (source) computer device provides a data file to a selected web server, which hosts the data file and may manage updates to the file using web feed syndication formats, such as RSS (Really Simple Syndication) or Atom. The web server may convert the data file to a web page format. The web server also generates a web page link to the data file and sends the link to the first computer device for use in an application on the first computer device, such as a web browser. The web browser application may add the web page link associated with the data file as a new bookmark in the web browser application. The first computer device then synchronizes its bookmark list in the web browser application to the bookmark list in the web browser application of the second (receiving) computer device. Consequently, the web browser application of the second computer device now contains a bookmark link to the data file hosted at the web server. Thus, a user of the second computer device is now able to access and view the content of the data file by selecting the bookmark link in its web browser, even though the original data file format could not be transferred from the first computer device to the second computer device due to software limitations of the second computer device.

Figure 3:
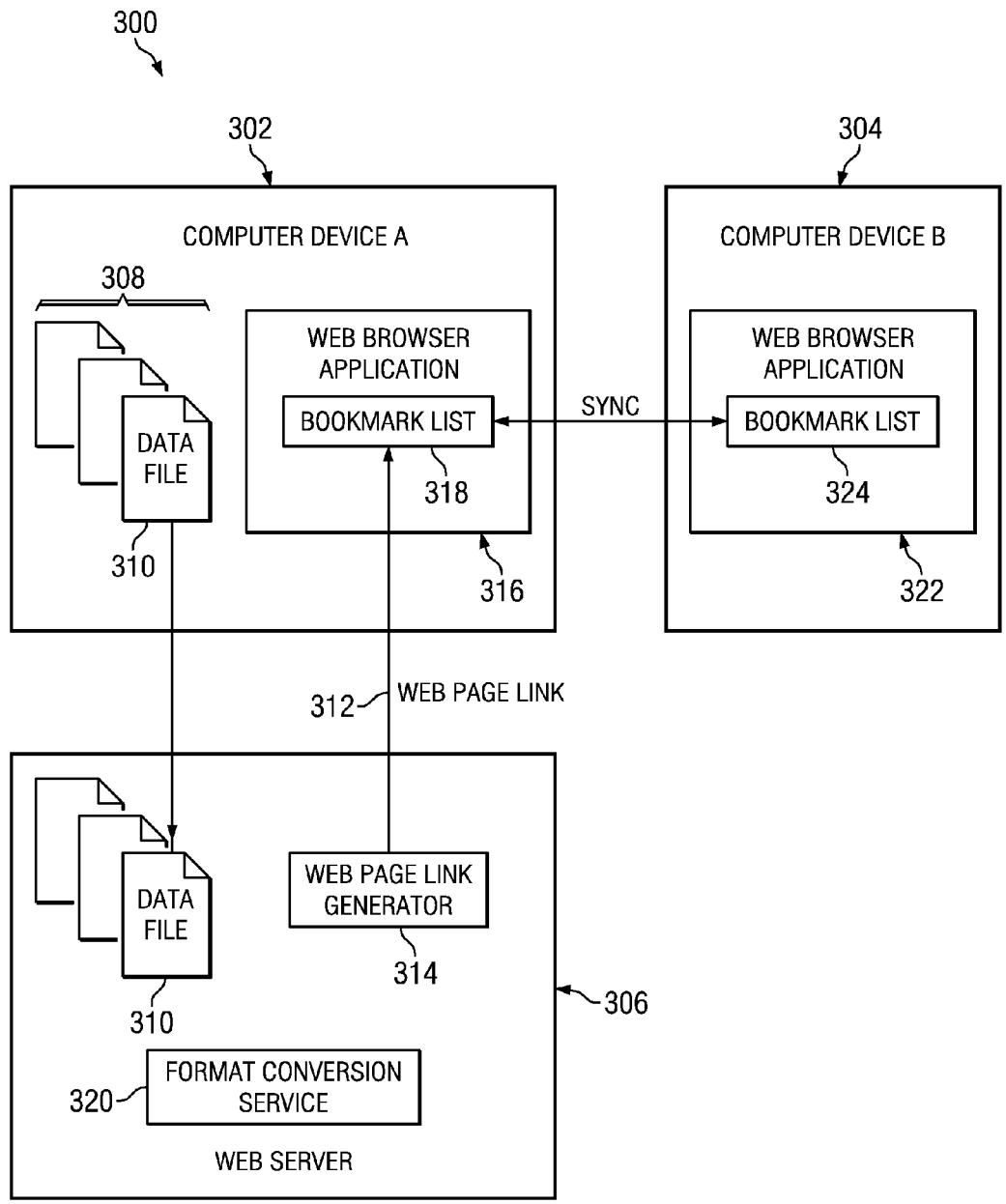
FIG. 3 is a block diagram of components in the data processing system used to implement aspects of the illustrative embodiments.

FIG. 3 is a block diagram of components in the data processing system used to implement aspects of the illustrative embodiments. Data processing system 300 is an example of data processing system 100 in FIG. 1. Data processing system 300 comprises computer device A 302, computer device B 304, and web server 306. Computer device A 302 is an example of computer 110 or 112 in FIG. 1. Web server 306 is an example of servers 104 or 106 in FIG. 1. Computer device B 304 is an example of computer 110, 112, or phone 114 in FIG. 1. However, it should be noted that data processing system 300 is only meant as an example and not intended as a limitation on different illustrative embodiments. In other words, data processing system 300 may include more or fewer components as necessary to accomplish processes of the illustrative embodiments.

Computer device A 302 comprises a computer from which a set of data files 308 may be transferred. A set of data files may comprise one or more files. Data files may include, but are not limited to, text files, image files, audio files, video files, among others. A user of computer device A 302 (e.g., a desktop computer) and computer device B 304 (e.g., a mobile phone) may want to transfer a data file, currently residing on computer device A 302, to computer device B 304. However, computer device B 304 does not support the file to be transferred. A data file is unsupported by a computer device if the software in the computer device is not capable of receiving the data file being transferred from another computer device. For example, the mobile phone may comprise software capable of supporting/receiving certain data file types, such as .mp3 audio files and/or .pdf files, but cannot receive .txt files or .doc files.

When the user cannot transfer the data file due to the software limitations of computer device B 304, the user may utilize a web server to enable access to the content of the data file through computer device B 304, even though computer device A 302 cannot actually transfer the data file to computer device B 304. To enable access on computer device B 304 of data files unsupported by computer device B 304, computer device A 302 sends one or more data files 308 residing on computer device A 302 to web server 306. A user of computer device A 302 may send a data file to web server 306 based on user knowledge that computer device B 304 cannot receive the data file from computer device A 302. In another embodiment, computer device A 302 may automatically send a data file to web when computer device A 302 detects that a file transfer of the data file to computer device B 304 is unsuccessful.

Web server 306 may be a web server in a plurality of available file hosting web servers. Web server 306 comprises a file hosting service that receives and hosts the data files. The file hosting service is a mechanism that provides file space on web server 306 for use by networked computer devices A 302 and B 304. Web server 306 may also obtain updates to the hosted data files from computer device A 302 or other computer devices, thereby enabling web server 306 to provide the most current version of the data files. The data files may be provided to web server 306 using File Transfer Protocol (FTP) or other web access protocols. The user of computer device A 302 may select a particular web server from a list of available web servers to host the set of data files 308. This selection may be performed prior to any data files being sent to the web server 306 or, alternatively, the user may select web server 306 for hosting the converted data files at the time a data file is sent to web server 306.

Responsive to receiving a data file (e.g., data file 310) from computer device A 302, web server 306 stores data file 310 in a memory and hosts the file as a web page. A format conversion service 320 may be utilized to convert the data file into a web page format using various methods. One method comprises converting a data file to another format using an application capable of opening the data file and exporting the file in a format usable as a web page. For example, if the data file is a .doc file, format conversion service 320 may use a command line argument to instruct Microsoft® Word to open the file and then save the file an HTML page. Similarly, a CAD drawing or Adobe® Photoshop® image file may be exported as a PDF or Image file by the software normally used to open the files. In an alternative example, format conversion service 320 may open an application that understands the data format in question and record screen shots of the data file, which may be then inserted into a webpage. It should be noted that although format conversion service 320 is shown as a component located within web server 306, format conversion service 320 may also be located external to web server 306, such as within computer device A 302. In this case, the format conversion service in computer device A 302 converts data files 308 into web page formats prior to sending the converted data files to web server 306.

Once data file 310 is in a web page format, web server 306 generates a web page link 312 to data file 310 using web page link generator 314. Web page link 312 may comprise the uniform resource locator (web address) of data file 310. Web page link 312 may alternatively comprise a link to the RSS or Atom feed of the data file. Web server 306 sends web page link 312 to web browser application 316 in computer device A 304.

When web browser application 316 in computer device A 302 receives web page link 312 from web server 306, web browser application 316 adds the link as a user-selectable item in web browser application 316. In one example, web page link 312 may be added to a new bookmark in a bookmark list 318 selectable by the user. The bookmark may comprise a "live" bookmark if the web page link comprises a link to the RSS or Atom feed of the data file (rather than to the data file itself). Upon adding new web page link 312 to a bookmark in bookmark list 318, computer device A 302 may synchronize its bookmarks with the bookmarks in computer device B 304. Synchronization is the process of establishing consistency among data from a source device and a target device, and vice versa. Computer device B 304 comprises web browser application 322 which, like web browser application 316 in computer device A 302, comprises bookmark list 324. Using file synchronization software available on computer device A 302, computer device A 302 initiates a synchronization process to allow any new bookmarks added to bookmark list 318 in computer device A 302 to be synced with the bookmark list 324 in computer device B 304. Consequently, bookmark list 324 will include the new bookmark link to data file 310 hosted by web server 306.

To access data file 310 hosted by web server 306 from computer device B 304, the user of computer device B 304 may select the corresponding bookmark from bookmark list 324 to request and retrieve data file 310 from web server 306, and the retrieved file is displayed in web browser application 322. Web browser application 322 may also display the link or bookmark in such a manner as to draw the user's attention to the link or bookmark. For example, newly synced links may be placed at the top of bookmark list 324. In another example, newly synced links may be displayed in a font, color, or style different from other links. Newly synced links may be placed and displayed in a folder in web browser application 322, with the folder indicating that the links are new or unread (e.g., a folder labeled "New Bookmarks"). In a further example, new links may be placed and displayed a folder in web browser application 322 that corresponds to the current date or the content of the data transfer session (e.g., a folder labeled "2008.06.20 New Bookmarks").

Figure 4:
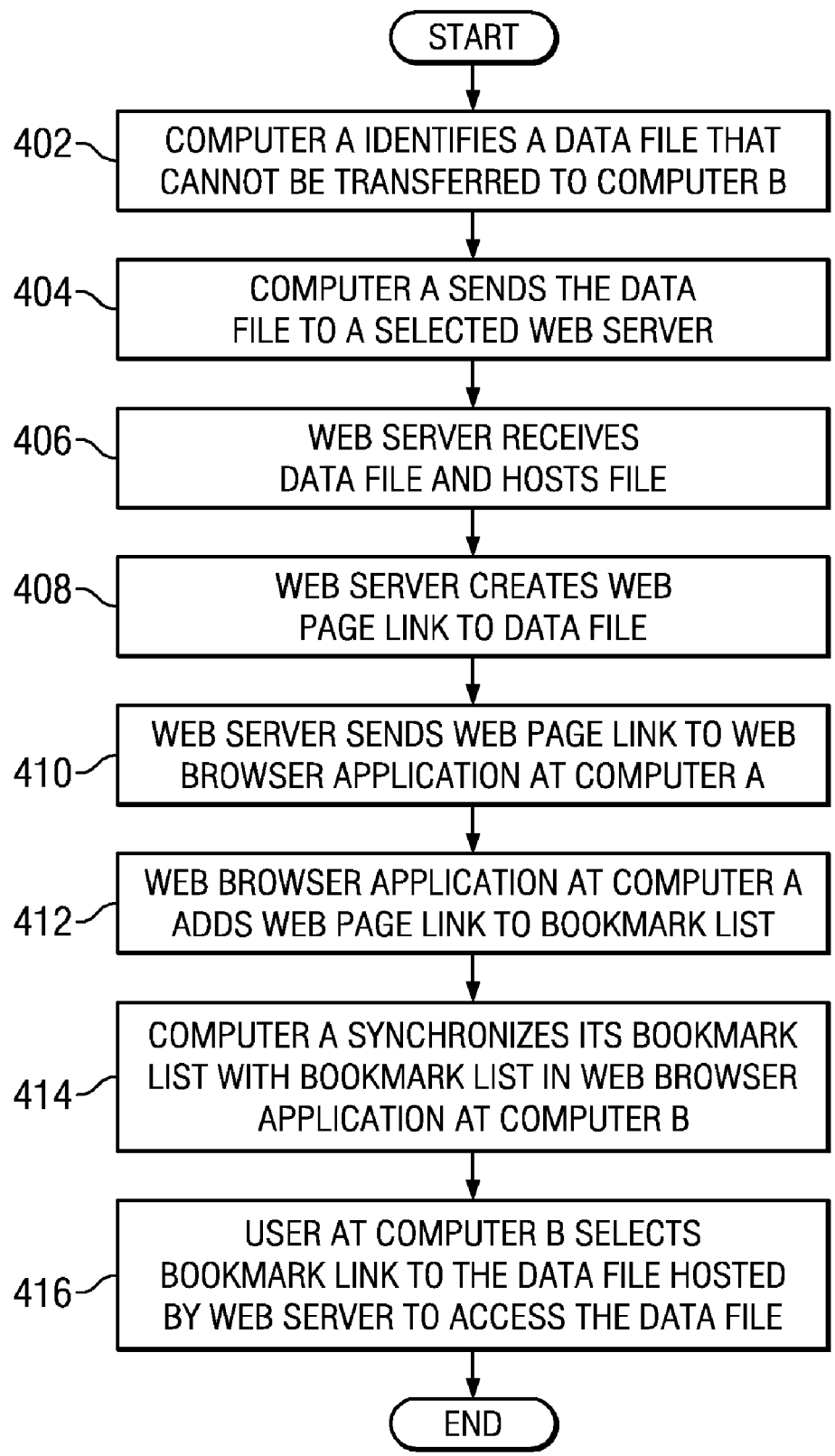
FIG. 4 is a flowchart of a process for allowing data files not transferrable to a computer device to be accessed by the computer device via a web server in accordance with the illustrative embodiments.

FIG. 4 is a flowchart of a process for allowing data files not transferrable to a computer device to be accessed by the computer device via a web server in accordance with the illustrative embodiments. The process described in FIG. 4 may be implemented in data processing system 300 in FIG. 3. The process begins with a first computer device identifying a set of data files that cannot be transferred to a second computer device (step 402). The set of data files may comprise a single file or a plurality of data files. The data files may comprise the same data format, different data formats, or a combination of both. The first computer device then sends each data file in the set of data files to a web server selected by a user (step 404).

Upon receiving a data file in the set of data files, the web server hosts the data file (step 406) and also generates a web page link for the data file (step 408). The web page link may comprise the uniform resource locator (URL) of the data file or an RSS or Atom feed of the data file. The web server sends the link to an application on the second computer device (e.g., a web browser application) (step 410). The web browser application may add the link as a selectable item or bookmark in the application (step 412). Adding the link may include displaying the link in any way that enables a user to notice the new link, such as by highlighting or showing the link in a font, color, or style different from other links or by placing the link in a particular folder or area of the display.

Responsive to adding the link as a bookmark in its web browser application, the first computer device initiates a synchronization process to sync the bookmarks in the web browser application of the first computer device to the web browser application of the second computer device (step 414). The synchronization process may include checking the bookmark list in the first computer device against the bookmark list in the second computer device. Any new bookmarks determined to have been added to the bookmark list of the first application since the prior synchronization are added to and displayed in the bookmark list of the web browser application of the second application. A newly synced bookmark may be displayed in a way that enables a user of the second computer device to notice the new link, such as by highlighting or showing the link in a font, color, or style different from other links or by placing the link in a particular folder or area of the display. The user of the second computer device may now access the data file hosted at the web server by selecting the bookmark in the web browser application on the second computer device (step 416), with the process terminating thereafter.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the aspects of the disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the aspects of the disclosure for various embodiments with various modifications as are suited to the particular use contemplated.

The aspects of the disclosure can take the form of an entirely hardware embodiment, an entirely software embodiment or an embodiment containing both hardware and software elements. In a preferred embodiment, the aspects of the disclosure are implemented in software, which includes but is not limited to firmware, resident software, microcode, etc.

Furthermore, the aspects of the disclosure can take the form of a computer program product accessible from a computer usable or computer readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the aspects of the disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the aspects of the disclosure, the practical application, and to enable others of ordinary skill in the art to understand the aspects of the disclosure for various embodiments with various modifications as are suited to the particular use contemplated.

What is claimed is:

1. A computer implemented method for managing access to data files, the computer implemented method comprising:
responsive to a determination at a first computer device that a data file cannot be transferred to a second computer device, sending, by the first computer device, the data file to a web server coupled to the first computer device via a network, wherein the web server hosts the data file;
responsive to sending the data file to the web server, receiving, from the web server, a web page link to the data file hosted at the web server;
creating, in a web browser application in the first computer device, a bookmark associated with the web page link to the data file hosted at the web server; and
synchronizing bookmarks in the web browser application of the first computer device with bookmarks in a web browser application in the second computer device such that a bookmark associated with the web page link to the data file hosted at the web server is also created in the web browser application of the second computer device.

2. The computer implemented method of claim 1, wherein selection of the bookmark associated with the web page link by a user at the second computer device retrieves the data file for display in the web browser application of the second computer device.

3. The computer implemented method of claim 1, wherein web server converts a format of the data file into a web page format.

4. The computer implemented method of claim 1, wherein the web page link to the data file comprises a uniform resource locator of the data file hosted by the web server.

5. The computer implemented method of claim 1, wherein the web page link to the data file comprises a uniform resource locator of a syndication feed of the data file hosted by the web server.

6. The computer implemented method of claim 1, wherein creating the bookmark in the web browser application of the second computer device further comprises displaying the bookmark at a top of a list of bookmarks.

7. The computer implemented method of claim 1, wherein creating the bookmark in the web browser application of the second computer device further comprises highlighting the bookmark.

8. The computer implemented method of claim 1, wherein creating the bookmark in the web browser application of the second computer device further comprises displaying the bookmark in at least one of a color, font, or style different from existing bookmarks in a bookmark list in the web browser of the second computer device.

9. The computer implemented method of claim 1, wherein creating the bookmark in the web browser application of the second computer device further comprises displaying the bookmark in a particular folder in the web browser application of the second computer device.

10. The computer implemented method of claim 9, wherein a name of the folder indicates a date the bookmark was created.

11. The computer implemented method of claim 9, wherein a name of the folder indicates a content of the data file.

12. A data processing system comprising:
a bus;
a storage device connected to the bus, wherein the storage device contains computer usable code; and
a processing unit connected to the bus, wherein the processing unit executes the computer usable code to, in response to a determination that a data file cannot be transferred to another computer device, send the data file to a web server coupled to the first computer device via a network, wherein the web server hosts the data file; receive, from the web server, a web page link to the data file hosted at the web server in response to sending the data file to the web server; create, in a web browser application, a bookmark associated with the web page link to the data file hosted at the web server; and synchronize bookmarks in the web browser application with bookmarks in a web browser application in the another computer device such that a bookmark associated with the web page link to the data file hosted at the web server is also created in the web browser application of the another computer device.

13. A computer program product for managing access to data files, the computer program product comprising:
a computer readable storage medium having computer readable program code stored thereon, the computer readable program code for execution by a computer, comprising:
computer readable program code for, sending, by a first computer device, a data file to a web server coupled to the first computer device via a network in response to a determination at the first computer device that the data file cannot be transferred to the second computer device, wherein the web server hosts the data file;
computer readable program code for receiving, from the web server, a web page link to the data file hosted at the web server in response to sending the data file to the web server;
computer readable program code for creating, in a web browser application in the first computer device, a bookmark associated with the web page link to the data file hosted at the web server; and
computer readable program code for synchronizing bookmarks in the web browser application of the first computer device with bookmarks in a web browser application in a second computer device such that a bookmark associated with the web page link to the data file hosted at the web server is also created in the web browser application of the second computer device.

14. The computer program product of claim 13, wherein selection of the bookmark associated with the web page link by a user at the second computer device retrieves the data file for display in the web browser application of the second computer device.

15. The computer program product of claim 13, wherein web server converts a format of the data file into a web page format.

16. The computer program product of claim 13, wherein the web page link to the data file comprises one of a uniform resource locator of the data file or a uniform resource locator of a syndication feed of the data file hosted by the web server.

17. The computer program product of claim 13, wherein the computer readable program code for creating the bookmark in the web browser application of the second computer device further comprises computer readable program code for displaying the bookmark in a particular folder in the web browser application of the second computer device.

18. The computer program product of claim 17, wherein a name of the folder indicates at least one of a date the bookmark was created or a content of the data file.

19. The computer program product of claim 13, wherein the computer usable program code is stored in a computer readable storage medium in a data processing system, and wherein the computer usable program code is downloaded over a network from a remote data processing system.

20. The computer program product of claim 13, wherein the computer usable program code is stored in a computer readable storage medium in a server data processing system, and wherein the computer usable program code is downloaded over a network from a remote data processing system for use in a computer readable storage medium with the remote system.

* * * * *